(12) United States Patent
Krumböck

(10) Patent No.: US 7,491,048 B2
(45) Date of Patent: Feb. 17, 2009

(54) EXTRUSION DIE FOR EXTRUDING HOLLOW PROFILES

(75) Inventor: Erwin Krumböck, Ansfelden (AT)

(73) Assignee: Gruber & Co Group GmbH, Pettenbach (AT)

( * ) Notice: Subject to any disclaimer, the term of this patent is extended or adjusted under 35 U.S.C. 154(b) by 0 days.

(21) Appl. No.: 11/658,286

(22) PCT Filed: May 17, 2005

(86) PCT No.: PCT/AT2005/000164

§ 371 (c)(1), (2), (4) Date: Mar. 8, 2007

(87) PCT Pub. No.: WO2006/007606

PCT Pub. Date: Jan. 26, 2006

(65) Prior Publication Data

US 2007/0298140 A1   Dec. 27, 2007

(30) Foreign Application Priority Data

Jul. 23, 2004   (AT) .............................. A 266/2004

(51) Int. Cl.
*B29C 47/06* (2006.01)
*B29C 47/20* (2006.01)

(52) U.S. Cl. ................. 425/131.1; 425/133.1; 425/380; 425/382.4; 425/461; 425/467

(58) Field of Classification Search ............ 425/131.1, 425/133.1, 192 R, 380, 382.4, 461, 467
See application file for complete search history.

(56) References Cited

U.S. PATENT DOCUMENTS 3,825,641 A * 7/1974 Barnett ........................ 264/560

4,296,062 A * 10/1981 Gauchel et al. ........... 264/172.1
4,383,812 A * 5/1983 Calcagni .................. 425/133.1
5,252,268 A   10/1993 Ohno (Continued)

FOREIGN PATENT DOCUMENTS

DE   37 25 447   2/1989

(Continued)

OTHER PUBLICATIONS

International Search Report for PCT/AT2005/000164; Sep. 28, 2005.

*Primary Examiner*—Robert B Davis
*Assistant Examiner*—Joseph Leyson
(74) *Attorney, Agent, or Firm*—Collard & Roe, P.C.

(57) ABSTRACT

An extrusion die for extruding hollow profiles is suggested having a die head (2), which is connected to a runner part (1) and forms extrusion channels (3) for shaping a profiled strand (4), and having a runner chamber (5), which is provided between the die head (2) and the runner part (1) and runs transversely to the extrusion channels (3), which is connected around its circumference (8) to an annular channel (7) for impingement with plastic melt and from which the extrusion channels (3) of the die head (2) originate. In order to provide advantageous construction conditions, it is suggested that the runner part (1) have an inner channel (9) discharging into the runner chamber (5) inside the annular channel (7) for additional impingement of the runner chamber (5) with plastic melt.

6 Claims, 3 Drawing Sheets

U.S. PATENT DOCUMENTS

| | | | |
|---|---|---|---|
| 5,282,731 A | | 2/1994 | Dinter |
| 5,733,491 A | * | 3/1998 | Grosset et al. ........... 264/172.1 |
| 6,533,979 B1 | | 3/2003 | Lee |
| 6,783,348 B2 | * | 8/2004 | Lee ......................... 425/131.1 |

FOREIGN PATENT DOCUMENTS

EP    0 816 047    1/1998

\* cited by examiner

EXTRUSION DIE FOR EXTRUDING HOLLOW PROFILES

CROSS REFERENCE TO RELATED APPLICATIONS

This application is the National Stage of PCT/AT2005/000164 filed on May 17, 2005, which claims priority under 35 U.S.C. §119 of Austrian Application No. A 1266/2004 filed on Jul. 23, 2004. The international application under PCT article 21 (12) was not published in English.

FIELD OF THE INVENTION

The present invention relates to an extrusion die for extruding hollow profiles having a die head, which is attached to a runner part and forms extrusion channels for shaping a profiled strand, and having a runner chamber, which is provided between the die head and the runner part and runs transversely to the extrusion channels, which is attached around its circumference to an annular channel for impingement with plastic melt and from which the extrusion channels of the die head originate.

DESCRIPTION OF THE PRIOR ART

In typical extrusion dies, an inlet area is provided between the generally round connection channel and a die head, whose extrusion channels are based closely on the contour of the profile to be extruded in regard to their position and gap width, and which forms a gradual transition from the connection channel to the extrusion channels of the die head in order to avoid stagnation zones, i.e., zones having lower flow speed, in the area of the melt flow. Specifically, the danger exists in such stagnation zones that in the event of thermally unstable melts, e.g., PVC, the plastic will be damaged. These extrusion dies have the disadvantage that they may only be used for one profile cross-section. In order to avoid this disadvantage, providing a runner part instead of the inlet area, which has a runner chamber toward the die head, from which the extrusion channels of the die head originate, so that the runner part may be implemented largely independently of the contour of the extrusion channels, is additionally known. An annular channel is provided for feeding the plastic melt into the runner chamber, which discharges into the runner chamber around its circumference, so that the plastic melt essentially flows through the runner chamber radially from the outside to the inside to the connected extrusion channels. With the aid of these known extrusion dies having a runner part, solid profiles may be produced without danger of damage for thermally unstable plastic melts, but not hollow profiles.

SUMMARY OF THE INVENTION

The present invention is thus based on the object of providing an extrusion die for extruding hollow profiles which manages without the use of an inlet area which restricts the profile cross-section for the gradual transition from the connection channel to the extrusion channels of the die head.

Proceeding from an extrusion die of the type described at the beginning, the present invention achieves the stated object in that the runner part has an inner channel, which discharges inside the annular channel into the runner chamber, for additionally impinging the runner chamber with plastic melt.

The present invention is based on the recognition that a flow of the plastic melt without stagnation zones which extends over the entire runner chamber may only be maintained in the runner chamber of the runner part, independently of the position and the dimensions of the extrusion channels, if the runner chamber is impinged by two independent melt flows directed opposite one another, namely one melt flow directed radially from the outside to the inside and one melt flow directed radially from the inside to the outside.

In addition, this results in a melt flow also arising in the area of hollow chambers, whose extrusion channels, which enclose it, may otherwise only be externally charged. In contrast to the prior art, the additional melt flow of the inner channel displaces the plastic melt from the hollow chamber area into an extrusion channel delimiting the hollow chamber area, which keeps the runner chamber free of stagnation zones. Therefore, it may always be ensured by the measures according to the present invention that the opposing melt flows are incident on one another at least in the area of an extrusion channel and drain off via this extrusion channel. In this context, it is to be ensured that flows made of plastic melts do not behave turbulently, so that the melt flows incident on one another may be drained from the runner chamber without significant mixing via a shared extrusion channel, the interface between the melt flows running inside the extrusion channel and thus inside the profile wall thus established.

If the die head supports a runner cone projecting into the runner chamber toward the inner channel, the melt of the inner channel may thus be introduced into the runner chamber especially uniformly. Stagnation zones on the side of the runner chamber diametrically opposite the mouth of the inner channel are thus precluded.

If the runner chamber has a smaller flow cross-section than the annular channel and the inner channel, the flow velocity in the runner chamber may be increased in relation to the annular channel and the inner channel. This is particularly advantageous in the zones of the incidence of both melt flows, since thus stagnation zones may be avoided in the flow shadows of the two incident melt flows. The danger of forming such stagnation zones arises above all where the two melt flows are incident on one another and are deflected, i.e., in particular in the deflection area of the particular extrusion channel to the diametrically opposite side of the runner chamber.

If the annular channel and the inner channel are impinged with different plastic melts, the possibility is opened up of using different plastic melts for a hollow profile. For example, high-quality plastic melts may thus be used for the annular channel and lower-quality plastic melts may be used for the inner channel. Since the plastic melts from the annular channel form at least the outer surface of the profiled strand to be manufactured, the melt flow from the inner channel may not penetrate anywhere up to the external surface of the profiled strand, so that it is ensured without additional measures that the external surfaces of the profiled strand continuously comprise the plastic melt of the annular channel.

If the extrusion channels of the die head are provided with spacing inside the circumference of the runner chamber, an extrusion die which is extremely capable of adaptation may be provided, because different hollow profiles may be extruded by replacing the die head. In contrast to the prior art, the runner part may be used further without consideration of possible constructive adaptations, which provides an extrusion nozzle usable in comparatively manifold ways.

If the runner chamber is implemented as a recess of the die head covered by the runner part, the dimensions of the runner chamber may be changed by replacing the die head. The runner chamber is therefore always adaptable to the particular requirements via the die head, which provides an extrusion die having a universal runner part, on which different die heads may be placed.

BRIEF DESCRIPTION OF THE DRAWING

The subject matter of the present invention is illustrated for exemplary purposes on the basis of two embodiments in the drawing.

DESCRIPTION OF THE PREFERRED EMBODIMENT

Figure 1:
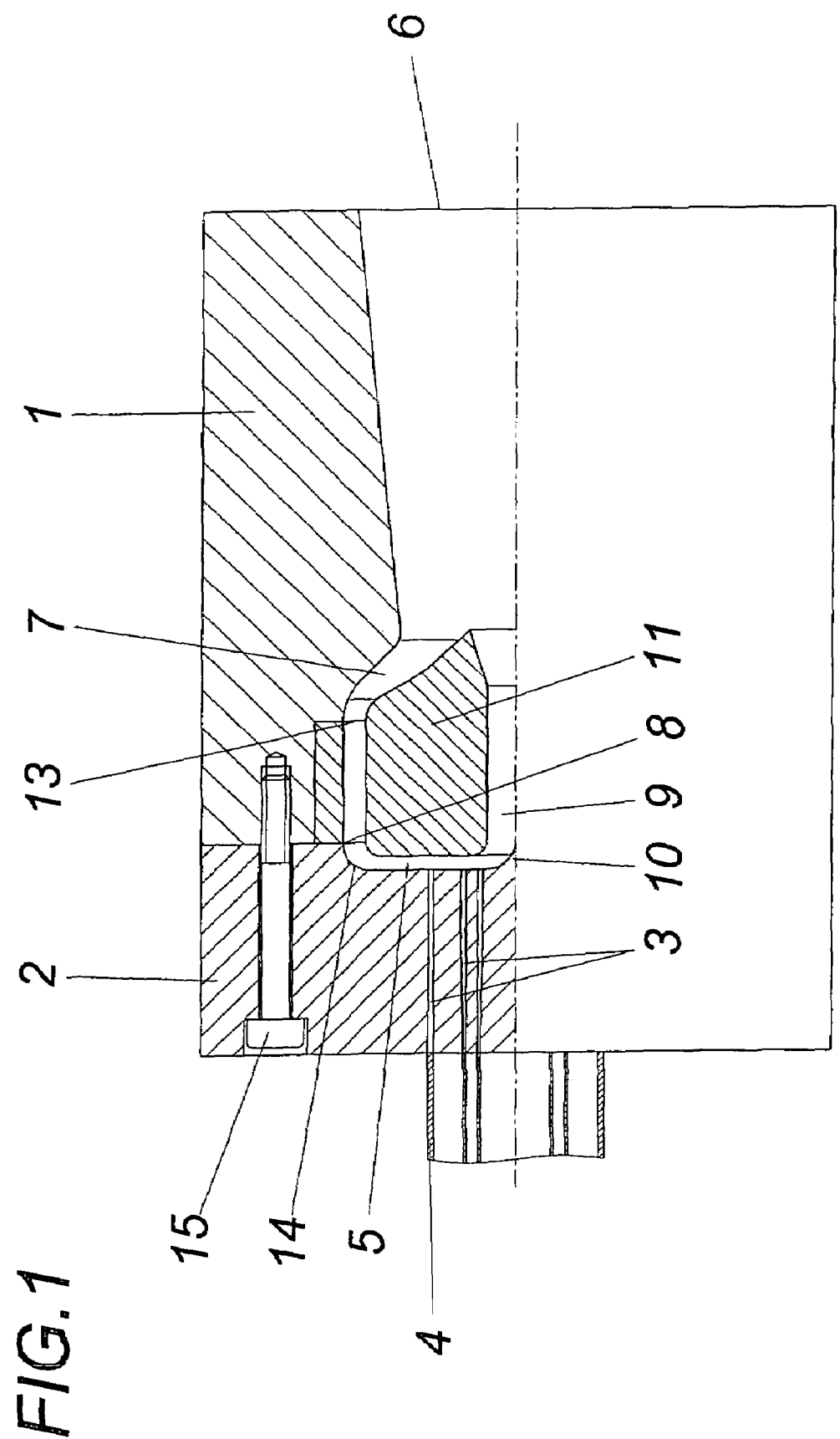
FIG. 1 shows a first embodiment of the extrusion die according to the present invention in a partially cutaway side view.
Figure 2:
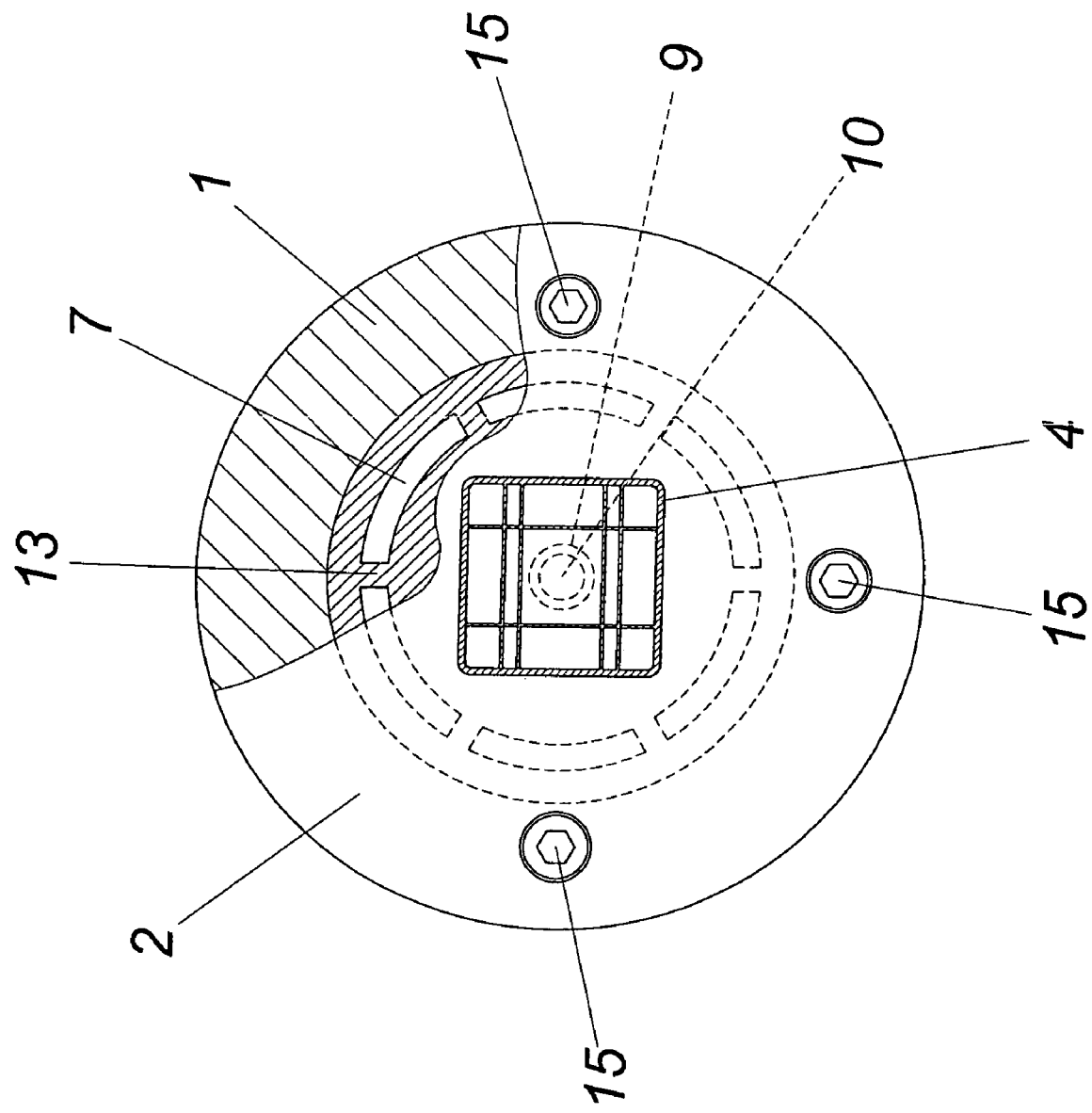
FIG. 2 shows a partially cutaway top view of the extrusion die from FIG. 1.

According to FIG. 1, the extrusion die for extruding hollow profiles which is illustrated as an example comprises a runner part 1 and a die head 2. The die head 2 has extrusion channels 3 for shaping a profiled strand 4, the die head 2 being attached to the runner part 1 and being impinged with plastic melt by the runner part 1. A runner chamber 5 is provided between the die head 2 and the runner part 1, which runs transversely to the extrusion channels 3 and from which the extrusion channels 3 of the die head 2 originate. The plastic melt supplied to the runner part 1 via a connection opening 6 is supplied with the aid of an annular channel 7 to the runner chamber 5, the runner chamber 5 being connected to the annular channel 7 around its circumference 8. According to the present invention, the runner chamber 5 is additionally impinged with plastic melt from an inner channel 9, which discharges into the runner chamber 5 inside the annular channel 7. Two flows made of plastic melt, which are directed opposite one another and are independent of one another, thus arise, which possibly discharge jointly into an extrusion channel 3. Therefore, according to the present invention, a specific flow velocity always exists in the runner chamber 5, so that dwelling of plastic melt in the runner chamber 5 may be precluded. Stagnation zones therefore also cannot arise. The areas in which the two flows are incident on one another and also the particular flow velocities do result as a function of the overall die system, i.e., not only because of the relevant properties of the extrusion die, but because of the minimum flow velocity in the overall runner chamber 5, no stagnation zones may result.

If zones having comparatively low flow velocities are established in operation of the extrusion die, the particular flow resistance may be changed in the annular channel 7 and/or in the inner channel 9 in order to advantageously adapt the flow velocities in the runner chamber to the particular conditions by a change of the melt flow distribution to the annular channel 7 and the inner channel 9. Advisable measures for this purpose are, for example, changing the diameter of the inner channel 9, changing the gap width of the annular channel 7, or also changing the gap width of the runner chamber 5. Therefore, adjustments may be made which avoid unacceptably low flow velocities in the runner chamber 5 without, however, thus significantly changing the extrusion velocity of the profiled strand 4.

The die head 2 supports a runner cone 10 projecting into the runner chamber 5 toward the inner channel 9, which advantageously distributes the plastic melt flowing through the inner channel 9 onto the runner chamber 5. In addition, the flow behavior of the plastic melt is thus impaired as little as possible.

The runner chamber 5 has a smaller flow cross-section than the annular channel 7 or the inner channel 9, so that high flow velocities in the runner channel 5 are to be expected. The danger of possible stagnation zones may thus be reduced even further.

Figure 3:
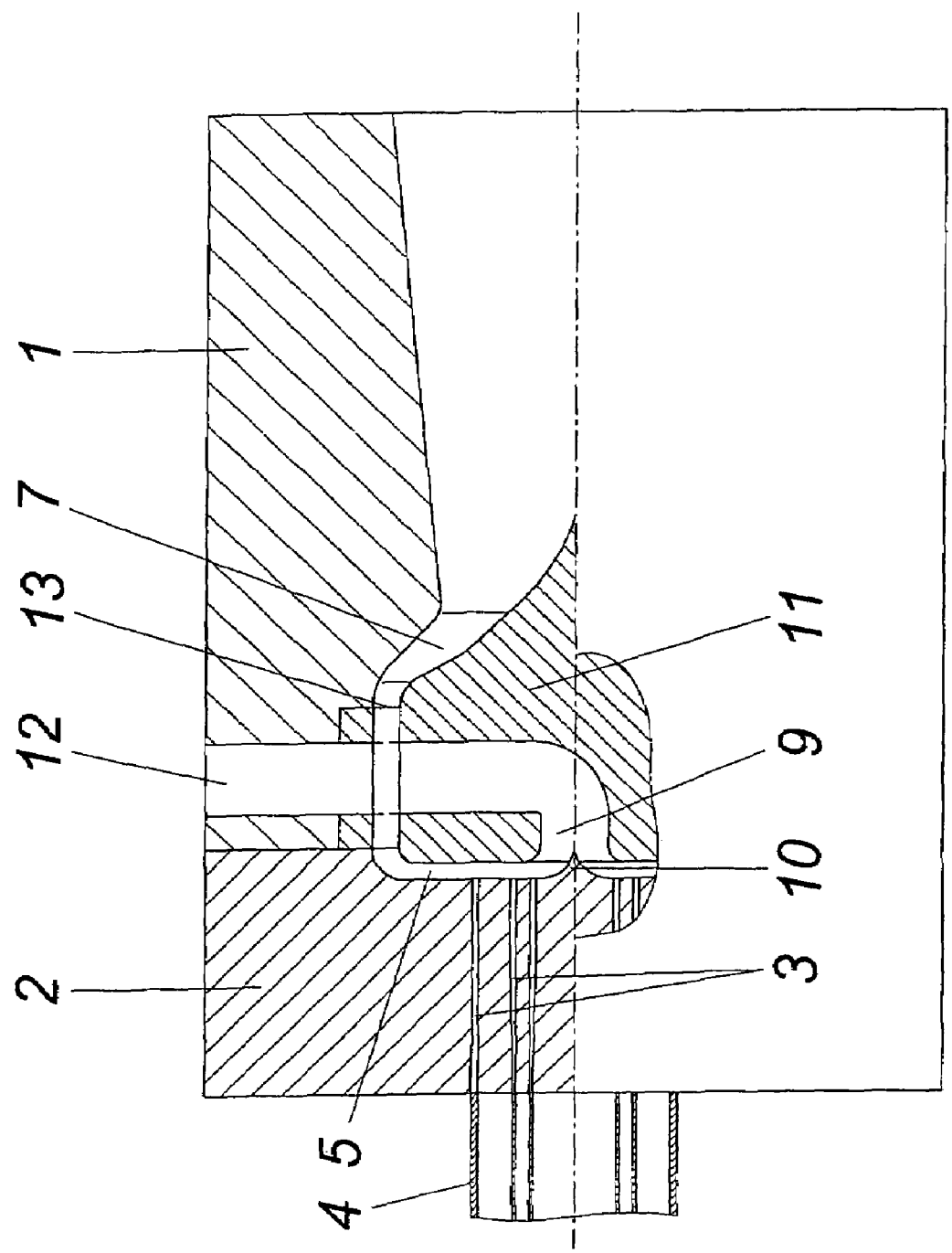
FIG. 3 shows a further embodiment of the extrusion die according to the present invention having different charging of the annular channel and the inner channel.

As shown in FIG. 1, the inner channel 9 and the annular channel 7 are charged with plastic melt via a shared connection opening 6, the runner part 1 having a displacement body in the form of a torpedo 11 for implementing the two channels 7 and 9. To be able to charge a profiled strand 4 using different plastic melts, the inner channel 9 has a separate connection 12, which may be seen from FIG. 3 in particular. The inner channel 9 thus has a separate charging capability, so that the inner part of the profiled strand 4 may be charged using melt made of recycled plastic, for example. The use of recycled plastic does not necessarily have to result in a quality loss, but recycled plastic usually has the disadvantage of visual discolorations. According to the present invention, it is ensured that the outside of the profiled strand 4 may be charged using fresh melt, so that discolorations in the interior of the profiled strand 4 are at least not visible from the outside. In order to be able to supply plastic melt to the inner channel 9, the inner channel 9 is connected to the connection 12 through one of the spokes 13 of the torpedo 11.

Furthermore, it is also conceivable, but not shown in greater detail, to impinge the inner channel 9 by an axial first extruder and the annular channel 7 by a second extruder, which lies radially outward therefrom, the torpedo 11 having flow around it in such a way as is known with a "side-fed die" in blow molding. This is expedient in particular if the profiled strand 4 is to comprise a majority of recycling material, so that the main quantity of the plastic melt must flow through the inner channel 9.

The extrusion channels 3 are provided inside the circumference 8 of the runner chamber 5, so that no constructive changes have to be performed on the annular channel 7 and/or on the inner channel 9 of the runner part 1 upon a replacement of the die head 2. The introduction of the plastic melt through the runner part 1 into the runner chamber 5 may therefore be maintained.

The runner chamber 5 is implemented as a recess 14 of the die head 2 covered by the runner part 1, so that the maximum diameter of the annular channel 7 may be used for charging the die head 1. An extrusion die usable in manifold ways is thus provided, which allows replacement of the die head 2 via the attachment bolts 15, without having to take the constructive embodiment of the runner part 1 into consideration. In addition, the flow resistance of the runner chamber 5 may be adapted by changing the dimensions of the recess 14 of the die head 2, which is exchangeable, in order to avoid low flow velocity in the runner chamber 5.

The invention claimed is:

1. An extrusion die for extruding hollow profiles comprising a runner part, a die head connected to the runner part and forming extrusion channels for shaping a profiled strand, a runner chamber arranged between the die head and the runner part, extending transversely to the extrusion channels and connected around its circumference to an annular channel for supplying a plastic melt to the extrusion channels of the die head, wherein the runner part has an inner channel, which discharges inside the annular channel in the runner chamber for additionally delivering plastic melt to the runner chamber, the annular channel and the inner channel being so arranged that streams of plastic melt flowing in opposite directions intersect at least one of the extrusion channels and flow off through said extension channel to avoid stagnation zones in the runner chamber.

2. The device according to claim 1, wherein the die head supports a runner cone which projects into the runner chamber (5) toward the inner channel.

3. The device according to claim 1, wherein the runner chamber has a smaller flow cross-section than the annular channel or the inner channel.

4. The device according to claim 1, wherein the annular channel and the inner channel receive different plastic melts.

5. The device according to claim 1, wherein the extrusion channels of the die head are spaced inwardly from the circumference of the runner chamber.

6. The device according to claim 1, wherein the runner chamber is a recess of the die head which is covered by the runner part.

* * * * *

UNITED STATES PATENT AND TRADEMARK OFFICE
CERTIFICATE OF CORRECTION

| | | |
|---|---|---|
| PATENT NO. | : 7,491,048 B2 | Page 1 of 1 |
| APPLICATION NO. | : 11/658286 | |
| DATED | : February 17, 2009 | |
| INVENTOR(S) | : Krumböck | |

It is certified that error appears in the above-identified patent and that said Letters Patent is hereby corrected as shown below:

On the cover page, column 1, item [30] please change the Claim of Priority of the Foreign Application Priority Data to correctly read as follows:

--July 23, 2004  (AT) ..................A 1266/2004--.

Signed and Sealed this

Seventh Day of April, 2009

JOHN DOLL
*Acting Director of the United States Patent and Trademark Office*